United States Patent
Noviello et al.

(10) Patent No.: US 8,630,936 B2
(45) Date of Patent: *Jan. 14, 2014

(54) OUTLYING TRADING ORDERS

(75) Inventors: Joseph C. Noviello, New York, NY (US); Michael Sweeting, Aldershot (GB); Howard W. Lutnick, New York, NY (US)

(73) Assignee: BGC Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,958

(22) Filed: Jul. 16, 2012

(65) Prior Publication Data

US 2013/0066761 A1    Mar. 14, 2013

Related U.S. Application Data

(60) Continuation of application No. 12/191,075, filed on Aug. 13, 2008, now Pat. No. 8,224,733, which is a division of application No. 10/911,879, filed on Aug. 4, 2004, now Pat. No. 7,577,605.

(51) Int. Cl.
*G06Q 40/00* (2012.01)

(52) U.S. Cl.
USPC .......................................... 705/36 R; 705/37

(58) Field of Classification Search
USPC ............................................................. 705/37
See application file for complete search history.

(56) References Cited

U.S. PATENT DOCUMENTS

| | | | |
|---|---|---|---|
| 4,674,044 A | 6/1987 | Kalmus et al. | |
| 5,038,284 A | 8/1991 | Kramer | |
| 5,101,353 A | 3/1992 | Lupien et al. | |
| 5,136,501 A | 8/1992 | Silverman et al. | |
| 5,745,383 A | 4/1998 | Barber | |
| 5,774,880 A | 6/1998 | Ginsberg | |

(Continued)

FOREIGN PATENT DOCUMENTS

| | | |
|---|---|---|
| EP | 0854462 | 7/1998 |
| EP | 1256895 | 11/2002 |

(Continued)

OTHER PUBLICATIONS

Notification of Transmittal of the International Search Report and the Written opinion for International Application No. PCT/US06/01200; 6 pages; Jan. 15, 2008.

(Continued)

*Primary Examiner* — William Rankins

(74) *Attorney, Agent, or Firm* — Glen R. Farbanish

(57) ABSTRACT

A method of managing trading is provided. In a market for a particular type of instrument, buy orders and sell orders are received from a plurality of traders. Each buy order has an associated bid price and each sell order has an associated offer price. A determination is made of whether the particular trading order is an outlying trading order by determining whether the particular trading order differs from at least one comparison price by more than a threshold value. If it is determined that the particular trading order is an outlying trading order, a restrictive action is taken regarding the outlying trading order. For example, if a trader subsequently submits another trading order that would trade with the outlying trading order, an alert message may be sent to the trader and the subsequent trading order may be prevented from trading with the outlying trading order at least temporarily.

24 Claims, 3 Drawing Sheets

(56) References Cited

U.S. PATENT DOCUMENTS

| | | | |
|---|---|---|---|
| 5,926,801 | A | 7/1999 | Matsubara et al. |
| 6,161,099 | A | 12/2000 | Harrington et al. |
| 6,282,521 | B1 | 8/2001 | Howorka |
| 6,408,283 | B1 | 6/2002 | Alaia et al. |
| 6,505,174 | B1 | 1/2003 | Keiser et al. |
| 6,560,580 | B1 * | 5/2003 | Fraser et al. ............... 705/36 R |
| 6,606,604 | B1 | 8/2003 | Dutta |
| 6,871,214 | B2 | 3/2005 | Parsons et al. |
| 6,944,599 | B1 | 9/2005 | Vogel et al. |
| 7,006,991 | B2 | 2/2006 | Keiser et al. |
| 7,152,041 | B2 | 12/2006 | Salavadori et al. |
| 7,158,951 | B2 | 1/2007 | Stark |
| 7,529,707 | B2 | 5/2009 | Noviello et al. |
| 7,577,605 | B2 | 8/2009 | Noviello et al. |
| 7,620,591 | B2 | 11/2009 | Noviello et al. |
| 7,636,685 | B1 | 12/2009 | Ebert |
| 7,835,979 | B2 | 11/2010 | Noviello et al. |
| 2001/0051909 | A1 | 12/2001 | Keith |
| 2002/0046148 | A1 | 4/2002 | Alaia et al. |
| 2002/0052821 | A1 | 5/2002 | Terashima |
| 2002/0073014 | A1 | 6/2002 | Gilbert et al. |
| 2002/0082967 | A1 | 6/2002 | Kaminsky et al. |
| 2002/0091617 | A1 | 7/2002 | Keith |
| 2002/0091622 | A1 | 7/2002 | Mastwyk et al. |
| 2002/0095362 | A1 | 7/2002 | Masand et al. |
| 2002/0128958 | A1 | 9/2002 | Slone |
| 2002/0156716 | A1 * | 10/2002 | Adatia ............................ 705/37 |
| 2002/0156717 | A1 * | 10/2002 | Delta et al. ..................... 705/37 |
| 2002/0169704 | A1 | 11/2002 | Gilbert et al. |
| 2003/0040955 | A1 | 2/2003 | Anaya et al. |
| 2003/0041009 | A1 | 2/2003 | Grey et al. |
| 2003/0050879 | A1 | 3/2003 | Rosen et al. |
| 2003/0055768 | A1 * | 3/2003 | Anaya et al. .................... 705/36 |
| 2003/0065608 | A1 | 4/2003 | Cutler |
| 2003/0069834 | A1 | 4/2003 | Cutler |
| 2003/0126065 | A1 | 7/2003 | Eng et al. |
| 2004/0019554 | A1 | 1/2004 | Merold et al. |
| 2004/0024610 | A1 | 2/2004 | Fradkov et al. |
| 2004/0193527 | A1 | 9/2004 | Kelly et al. |
| 2004/0210511 | A1 | 10/2004 | Waelbroeck et al. |
| 2004/0230513 | A1 | 11/2004 | Davin et al. |
| 2004/0230522 | A1 | 11/2004 | Crosthwaite |
| 2004/0243502 | A1 | 12/2004 | Slowik et al. |
| 2004/0243505 | A1 | 12/2004 | Sweeting et al. |
| 2004/0254877 | A1 | 12/2004 | Buckwalter et al. |
| 2005/0038727 | A1 | 2/2005 | Ballman |
| 2005/0049956 | A1 | 3/2005 | Ballman |
| 2005/0075965 | A1 | 4/2005 | Cutler |
| 2005/0102216 | A1 | 5/2005 | Ballman |
| 2005/0108141 | A1 * | 5/2005 | Farrell et al. .................... 705/37 |
| 2005/0171888 | A1 | 8/2005 | Daley et al. |
| 2005/0187854 | A1 | 8/2005 | Cutler et al. |
| 2005/0240510 | A1 | 10/2005 | Schweickert et al. |
| 2005/0278242 | A1 | 12/2005 | Dankovchik et al. |
| 2005/0283421 | A1 | 12/2005 | Hatheway et al. |
| 2006/0020536 | A1 | 1/2006 | Renton et al. |
| 2006/0069636 | A1 | 3/2006 | Griffin et al. |
| 2006/0149655 | A1 | 7/2006 | Leahy et al. |
| 2007/0027796 | A1 | 2/2007 | Claus et al. |
| 2007/0088653 | A1 | 4/2007 | Ginsberg et al. |
| 2007/0174175 | A1 | 7/2007 | Brucato |
| 2008/0162378 | A1 | 7/2008 | Levine et al. |
| 2008/0301063 | A1 | 12/2008 | Noviello et al. |
| 2009/0327119 | A1 | 12/2009 | Noviello et al. |

FOREIGN PATENT DOCUMENTS

| | | |
|---|---|---|
| JP | 61-183776 | 8/1986 |
| JP | 06-096359 | 4/1994 |
| JP | 2002-41799 | 2/2002 |
| JP | 2003-122925 | 4/2003 |
| JP | 2003-296574 | 10/2003 |
| JP | 2004-537114 | 12/2004 |
| JP | 2006-505070 | 2/2006 |
| WO | WO 9826363 A1 * | 6/1998 |
| WO | WO 00/48113 | 8/2000 |
| WO | WO 01/22339 | 3/2001 |
| WO | WO 02/095525 | 11/2002 |
| WO | WO 2004/042514 | 5/2004 |

OTHER PUBLICATIONS

Pending U.S. Appl. No. 11/033,103; 73 pages; Jan. 11, 2005.
U.S. PTO Office Action for U.S. Appl. No. 11/033,103; 8 pages; Mar. 14, 2008.
Pending U.S. Appl. No. 12/100,048; 44 pages; Apr. 9, 2008.
Notification of Transmittal of the International Search Report and the Written opinion for International Application No. PCT/US05/27820; 9 pages; Aug. 13, 2008.
*Market Leaders combine Expetrtise to Create exciting new Alert Service*; Business Wire, p NA; 2 pages; Mar. 24, 2006.
U.S. PTO Office Action for U.S. Appl. No. 11/033,103; 21 pages; Jul. 24, 2008.
Pending U.S. Appl. No. 12/191,075; Aug. 13, 2008.
Pending U.S. Appl. No. 12/191,138; Aug. 13, 2008.
Pending U.S. Appl. No. 10/911,879; 59 pages; Aug. 4, 2004.
U.S. PTO Office Action for U.S. Appl. No. 10/911,879; 34 pages; Jan. 7, 2008.
U.S. PTO Office Action for U.S. Appl. No. 10/911,879; 23 pages; Jul. 25, 2008.
U.S. PTO Office Action for U.S. Appl. No. 12/100,048; 20 pages; Nov. 13, 2008.
Notice of Allowance for U.S. Appl. No. 11/033,103; 9 pages; Feb. 9, 2009.
Notice of Allowance for U.S. Appl. No. 10/911,879; 16 pages; Mar. 30, 2009.
U.S. PTO Office Action for U.S. Appl. No. 12/191,138; 6 pages; May 14, 2009.
U.S. PTO Office Action for U.S. Appl. No. 12/191,075; 10 pages; May 28, 2009.
Notice of Allowance for U.S. Appl. No. 12/100,048; 8 pages; Jul. 23, 2009.
U.S. PTO Office Action for U.S. Appl. No. 12/191,138; 13 pages; Nov. 12, 2009.
Australian Examination Report for AU Application No. 2006204850; May 26, 2010; 2 pages.
Australian Examination Report for AU Application No. 2005330042; Apr. 1, 2010; 2 pages.
Notice of Allowance for U.S. Appl. No. 12/191,138; 9 pages; Jun. 23, 2010.
A United Framework for pull control mechanism in multi stage manufacturing systems; George Liberopolous; Yves Dallery; Annals of Operations Research; Basel: 2000; vol. 93, Issue 1; p. 325.
U.S. PTO Office Action for U.S. Appl. No. 12/552,409; 5 pages; Jul. 8, 2010.
European Office Action for Application No. 06718291.5; 6 pages; Mar. 4, 2010.
U.S. PTO Office Action for U.S. Appl. No. 12/191,075; 14 pages; Sep. 16, 2010.
European Office Action for Application No. 06718291.5; 6 pages; May 17, 2011.
Japanese Office Action for Application No. 2007-550588; Nov. 15, 2011; 4 pages (includes 2 pages of English Translation).
U.S. PTO Office Action for U.S. Appl. No. 12/191,075; 11 pages; Apr. 25, 2011.
Notice of Acceptance for AU Application No. 2005330042; Dec. 21, 2011; 2 pages.
Japanese Office Action for Application No. 2007-525012; Jul. 26, 2011; 7 pages (includes 4 pages of English Translation).
Soejima, Yutaka, "Order handling method and price fluctuation in JGB futures markets, strategic analysis of order behaviors, presence of appropriate trading rules depending on market environments," Proceedings of the 9th Convention of Nippon Finance Association, Jun. 3, 2011 pp. 303-316.
U.S. PTO Office for U.S. Appl. No. 12/946,277; Mar. 2, 2012; 8 pages.

(56) References Cited

OTHER PUBLICATIONS

U.S. PTO Office Action for U.S. Appl. No. 12/552,409; 11 pages; Feb. 27, 2012.
Notice of Allowance for U.S. Appl. No. 12/191,075; 9 pages; Feb. 23, 2012.
Second Australian Examination Report for AU Application No. 2006204850; Feb. 27, 2012; 2 pages.
EPO Communication and Supplementary European Search Report for Application No. 05781964.1, dated Apr. 7, 2011 (8 pages).
Notice of Allowance for U.S. Appl. No. 12/552,409; 9 pages; Jul. 23, 2012.
U.S. PTO Office Action for U.S. Appl. No. 13/685,302; 5 pages; Mar. 1, 2013.
U.S. PTO Office Action for U.S. Appl. No. 12/946,277; 5 pages; Jan. 4, 2013.
Canadian Office Action for CA App. No. 2,593,771; 4 pages; Jul. 2, 2013.
EP Extended Search Report for EP App. No. 12004959.8; 7 pages; Dec. 13, 2012.
EP Summons for EP App. No. 06718291.5; 7 pages; Nov. 15, 2012.
EP Decision to Refuse for EP App. No. 06718291.5; 13 pages; Mar. 22, 2013.
JP Office Action for JP App. No. 2007-550588; 6 pages; Oct. 9, 2012 (w/English translation).
Canadian Office Action for CA App. No. 2,575,968; 3 pages; May 28, 2013.
EP Communication for EP App. No. 05781964.1; 9 pages; Feb. 1, 2013.
AU Examination Report for App. No. 2012201112; 2 Pages; Aug. 16, 2013.
EP Communication for EP App. No. 12004959.8; 6 pages; Aug. 8, 2013.

* cited by examiner

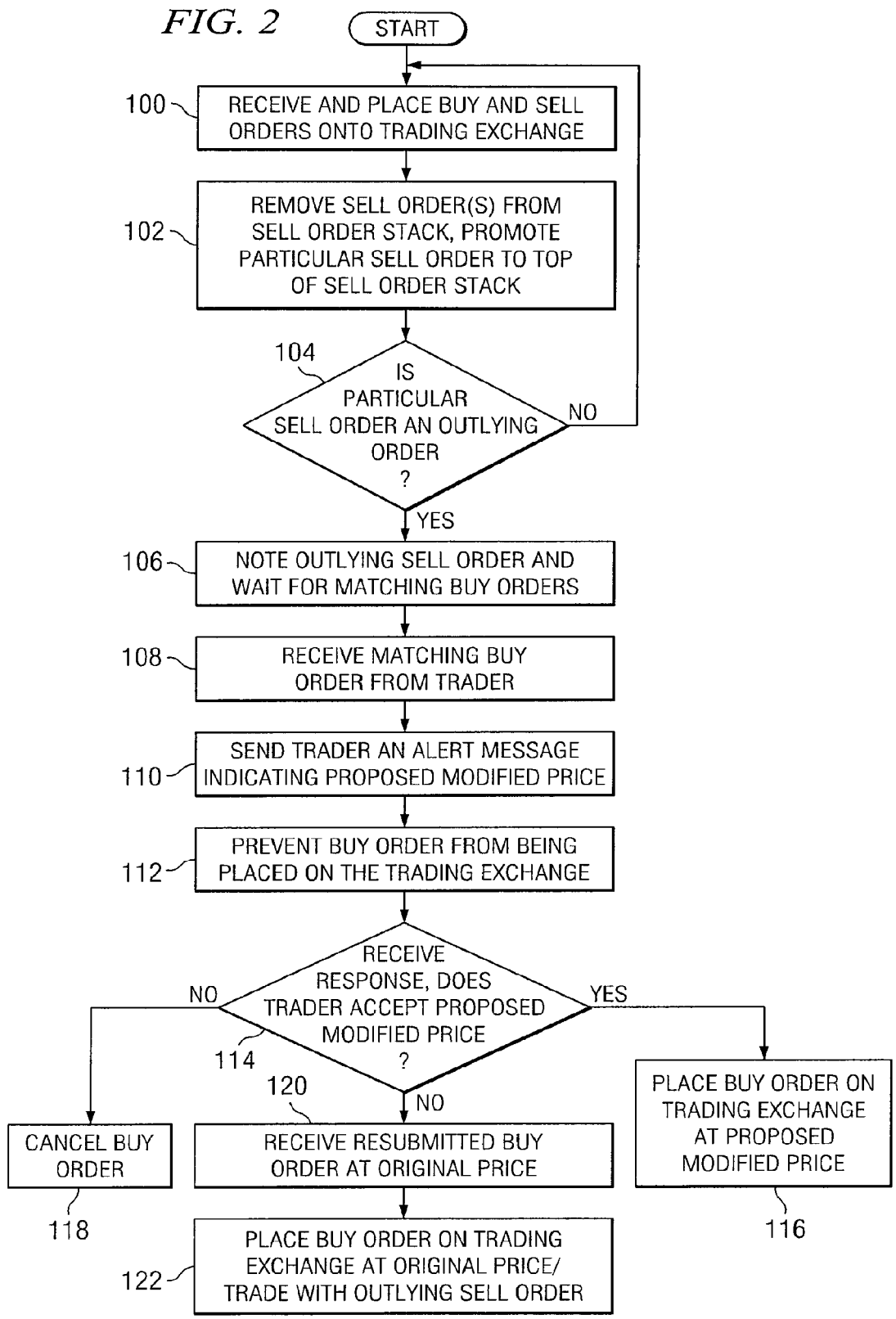

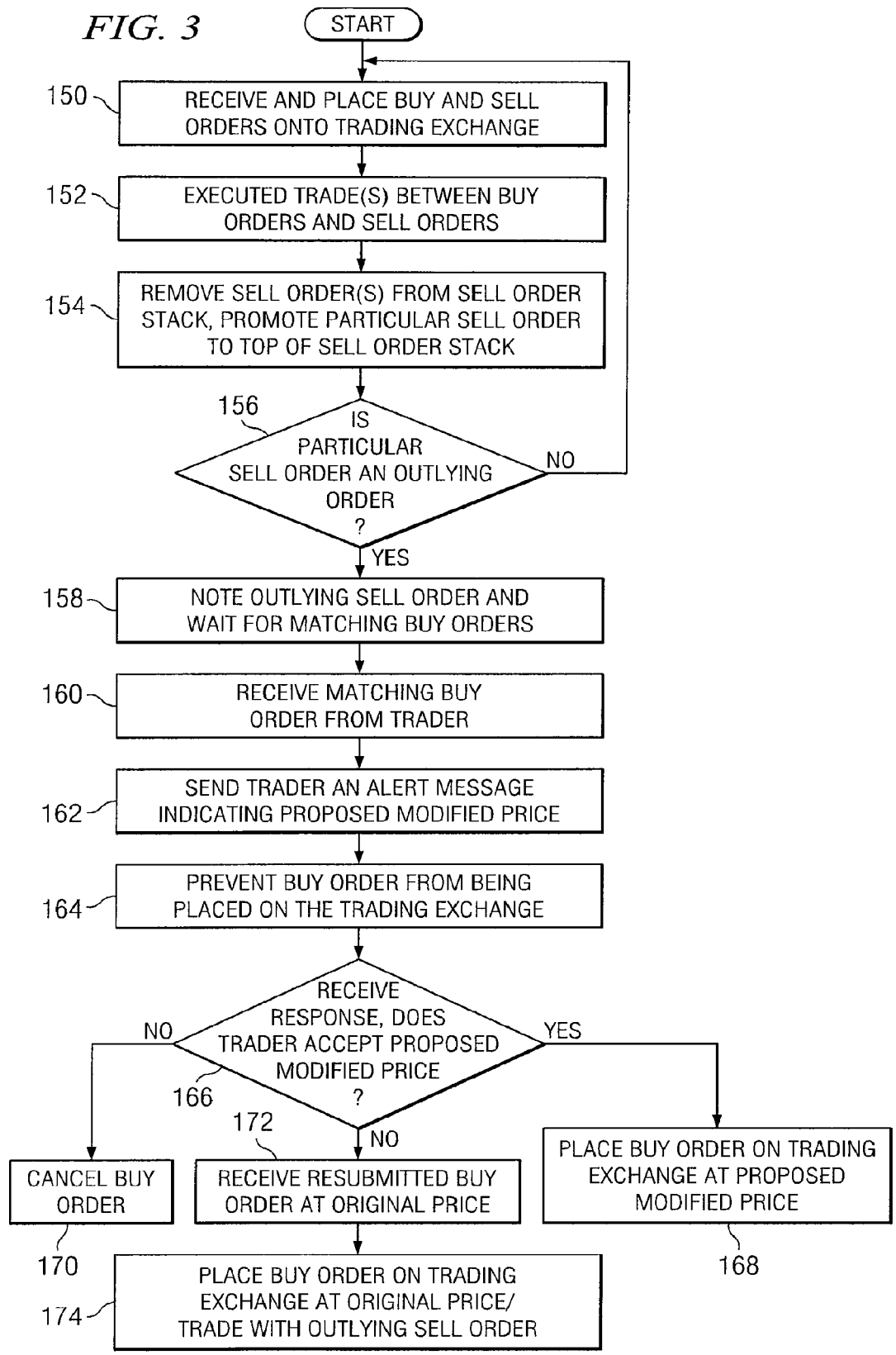

OUTLYING TRADING ORDERS

CROSS-REFERENCE TO RELATED APPLICATION

This application is a continuation of U.S. patent application Ser. No. 12/191,075, filed Aug. 13, 2008, now U.S. Pat. No. 8,224,733 by Joseph C. Noviello et al., and entitled "System and Method for Managing Trading Using Alert Messages for Outlying Trading Orders," which is a divisional of U.S. patent application Ser. No. 10/911,879, filed Aug. 4, 2004, now U.S. Pat. No. 7,577,605 by Joseph C. Noviello et al., and entitled "System and Method for Managing Trading Using Alert Messages for Outlying Trading Orders" each of which is hereby incorporated by reference herein in its entirety.

TECHNICAL FIELD OF THE INVENTION

This invention relates in general to market trading and, more particularly, to a system and method for using alert messages for outlying trading orders (such as buy and sell orders).

BACKGROUND OF THE INVENTION

In recent years, electronic trading systems have gained a widespread acceptance for trading items. For example, electronic trading systems have been created which facilitate the trading of financial instruments such as stocks, bonds, currency, futures, or other suitable financial instruments.

Many of these electronic trading systems use a bid/offer process in which traders submit buy (or bid) and sell (or offer) orders for a particular tradable instrument. The buy and sell orders are received by a trading platform and placed onto a trading exchange for the particular tradable instrument. Received buy orders may be placed in a buy order queue, or stack, and received sell orders may be placed in a sell order queue, or stack. Received orders may be placed into such stacks in various different manners, such as using a FIFO (first in, first out), a first buyer/first seller system as detailed in U.S. Pat. No. 6,560,580, or based on the bid and offer prices associated with each of the received buy and sell orders, for example.

In some markets, the bid and offer prices of buy and sell orders, respectively, are displayed in a numerical format having (a) a whole number component, which may be referred to as a "handle," and (b) a fractional number component, which may be expressed as a decimal, a fraction, a combination of a decimal and fraction, or otherwise expressed. For example, a bid price displayed as 94.26¼ includes a whole number (or handle) component of "94" and a fractional number component of "0.26¼." Similarly, an offer price displayed as 52³⁄₃₂ includes a whole number (or handle) component of "52" and a fractional number component of "³⁄₃₂." As another example, a bid or offer price displayed as 100.12 includes a whole number (or handle) component of "100" and a fractional number component of "0.12."

Often, an order having a price that differs by a relatively large amount from the current contra market for the same instrument, which may be referred to as an "outlying order," is promoted to the top of an order stack, such as when no better order is currently present, for example. In some instances, a trader may mistakenly attempt to trade with such an outlying order without realizing the actual price of outlying order, such as when the trader is concentrating only on the fractional number component of existing orders. For example, when an order that has a fractional number component similar to the current market but a whole number (or handle) component that is different from the current market (e.g., one or more points higher or lower than the current market) is promoted to the top of an order stack, traders may place orders attempting to trade with such an outlying order without realizing that the handle of the outlying order differs from the current market. In other words, the trader may have mistakenly viewed or considered only the fractional number component of the outlying order when submitting his order. In any event, the resulting executed trade is typically disadvantageous to the mistaken trader, who may then notify the trading platform of the mistaken trade. The trading platform may then have to undo one or more executed trades with the outlying order, which may require the trading platform to halt trading on the instrument, and which may cost the trading platform or either customer both time and money as a result of the ensuing confusion over whether a trade is to be cancelled or not.

SUMMARY OF THE INVENTION

In accordance with the present invention, system and methods are provided for determining whether a trading order (such as a buy or sell order, for example) is an outlying order. Systems and methods are also provided for using alert messages for outlying trading orders.

According to one embodiment, a method of managing trading is provided. In a market for a particular type of instrument, buy orders and sell orders are received from a plurality of traders. Each buy order has an associated bid price and each sell order has an associated offer price. Each of the received buy orders and sell orders are placed on a trading exchange such that the buy orders and sell orders may be executed. A determination is made of whether the particular trading order is an outlying trading order by determining whether the particular trading order differs from at least one comparison price by more than a threshold value. The comparison price may be another existing price, a price of a previous trade, a price determined based on one or more other markets, or any other suitable comparison price. If it is determined that the particular trading order is an outlying trading order, a restrictive action is taken regarding the outlying trading order. For example, if a trader subsequently submits another trading order that would otherwise match and execute a trade with the outlying trading order, an alert message may be sent to that trader and the subsequent trading order may be prevented from trading with the outlying trading order at least until a response to the alert message is received.

According to another embodiment, a system for managing trading is provided. The system includes a computer having a processor, and a computer-readable medium coupled to the computer. The computer-readable medium includes a program. When executed by the processor, the program is operable to receive trading orders from a plurality of traders in a market, each trading order having an associated price; place each of the received trading orders on a trading exchange such that the trading orders may be executed; determine whether the price of a particular trading order differs from a comparison price by more than a threshold value; and if it was determined that the price of the particular trading order differs from the comparison price by more than the threshold value, take a restrictive action regarding the particular trading order.

The restrictive action may be taken with respect to either, or both of, the trader placing the outlying trading order or the trader attempting to execute on the outlying trading order. The possible restrictive action is not limited to an alert message and may include other actions such as, for example, preventing or restricting promotion of the outlying order to the top of a bid or offer stack, preventing the display of the outlying order in a bid or offer stack (or modifying the display of the outlying order, such as by displaying the outlying order in a different color, for example), and preventing traders from executing trades on the outlying order.

Various embodiments of the present invention may benefit from numerous advantages. It should be noted that one or more embodiments may benefit from some, none, or all of the advantages discussed below.

One advantage of the invention is that a trading system is provided in which outlying trading orders (such as a buy order having a bid price significantly lower than the current market or a sell order having an offer price significantly higher than the current market) are identified and alert messages are sent to traders attempting to execute a trade on such outlying trading orders. An alert message may notify the trader that the price of his trading order may be mistaken and may provide the trader an opportunity to correct the mistaken price. As a result, the number of mistaken trades in a market may be reduced, thus saving the trading platform providing access to the market both time and money that would otherwise be spent identifying and undoing or otherwise managing mistaken trades.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 2 illustrates an example method of identifying outlying trading orders by comparing trading orders with contra market prices, and sending alert messages to traders attempting to trade on such outlying trading orders, in accordance with an embodiment of the present invention; and FIG. 3 illustrates an example method of identifying outlying trading orders by comparing trading orders with previous trade prices, and sending alert messages to traders attempting to trade on such outlying trading orders, in accordance with an embodiment of the present invention.

DETAILED DESCRIPTION OF THE DRAWINGS

Figure 1:
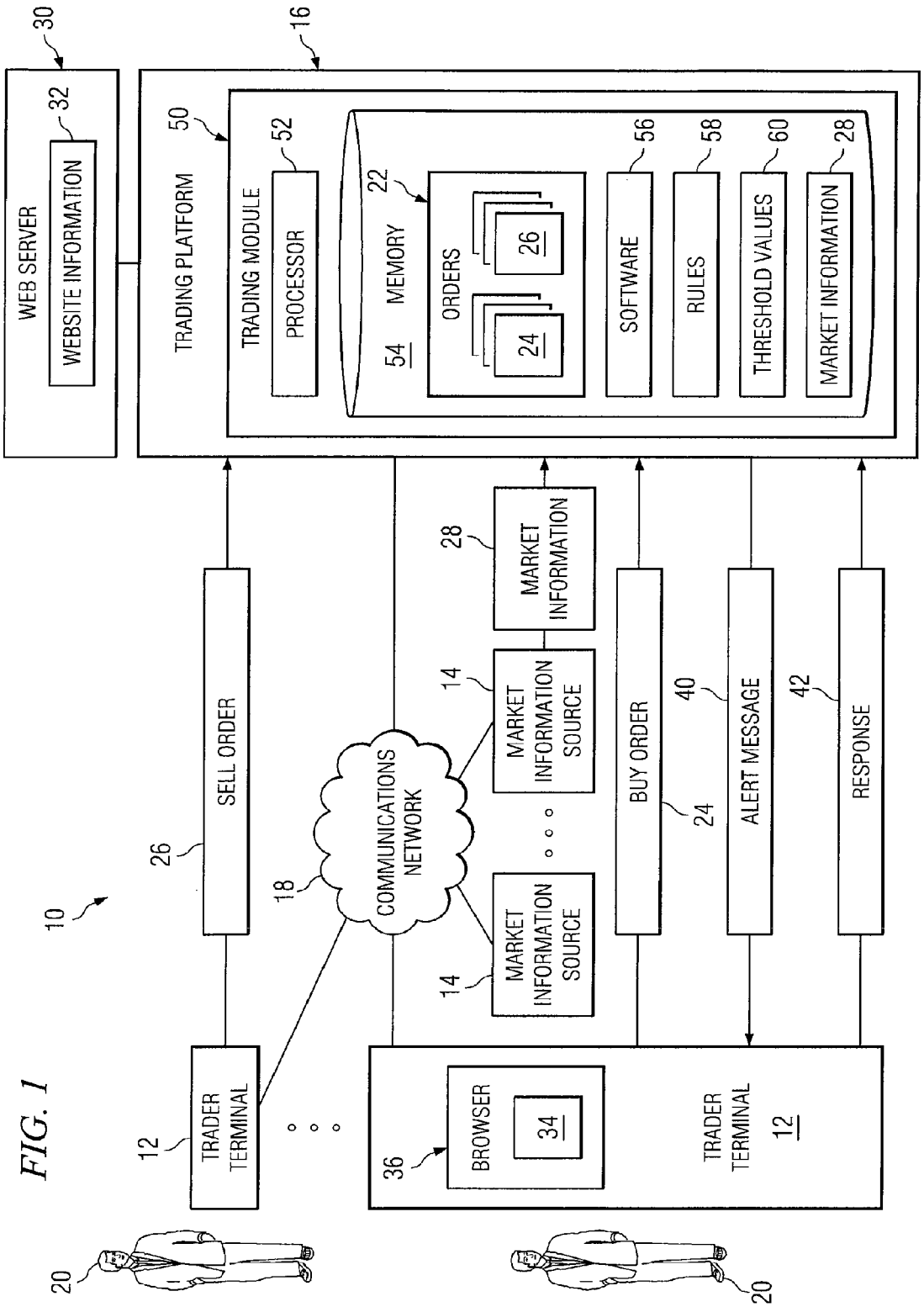
FIG. 1 illustrates an example system for managing trading using alert messages for outlying trading orders in accordance with an embodiment of the invention.

Example embodiments of the present invention and their advantages are best understood by referring now to FIGS. 1 through 3 of the drawings, in which like numerals refer to like parts. In general, according to at lease one embodiment, a trading system is provided that identifies a buy or sell trading order having an outlying bid or offer price and sends an alert message to a trader who submits a subsequent order in an attempt to execute a trade on the outlying buy or sell order. The alert message may provide the trader an opportunity to change, or correct, the price of the order, and the system may prevent the trader's order from being executed or even placed on the trading exchange until the system receives a response to the alert message from the trader.

In some embodiments, for example, buy and sell orders may be displayed in "stacks" on a trading exchange and may migrate to the tops of such stacks based on various rules or criteria. For example, buy orders having the highest current bid price may migrate to the top of a buy order stack and sell orders having the lowest current offer price may migrate to the top of a sell order stack. When a buy or sell order is promoted to the top of the buy order stack or the sell order stack, respectively, the system determines whether the newly promoted order is an outlying order by determining whether the price of the newly promoted order differs from the price of the existing (or last existing if there are none currently existing) contra market by more than some threshold value, which may vary according to market conditions. For example, the system may determine whether a newly promoted sell order is an outlying order by determining whether the offer price of the newly promoted sell order exceeds the bid price of the current top buy order by more than the threshold value. Similarly, the system may determine whether a newly promoted buy order is an outlying order by determining whether the bid price of the newly promoted buy order is less than the offer price of the current top sell order by more than the threshold value. The system may also determine whether newly placed orders are outlying orders in a similar manner.

It should be understood that in some situations, references to the "top order" or the "top of a stack" may refer to the best existing (buy or sell) order or the order at the front of a stack of orders, which orders may not be located at the physical "top" of their respective stack. For example, as discussed below in greater detail, in particular embodiments, buy orders are displayed on one side of a vertical list of numbers and sell orders are displayed on the opposite side of the same vertical list of numbers such that both buy orders and sell orders are arranged by price from high to low moving downward along the vertical list of numbers. Is such embodiments, although the existing sell order having the lowest offer price is actually located below the other existing sell orders, such existing sell order may be referred to as the top sell order or the sell order at the top of the sell order stack.

In another embodiment, when a buy or sell order is promoted to the top of the buy order stack or the sell order stack, respectively, the system determines whether the newly promoted order is an outlying order by determining whether the price of the newly promoted order differs from the price of a previous trade (such as the price at which the most recent trade was executed, for example) by more than some threshold value. As mentioned above, the threshold values may vary according to market conditions. For example, the threshold values may be determined and/or updated based on the historical or current volatility of related markets. Similarly, the value to which the order being analyzed is compared (i.e., to determine whether a threshold is exceeded) may itself be equal to or based on a value obtained from historical or current related market analysis.

In yet another embodiment, a confluence of the two embodiments above may be used whereby the system determines whether the newly promoted order is an outlying order by determining whether the price of the newly promoted order differs from both (1) the price of the best contra market and (2) the price of a previous trade by more than some threshold value. Such a methodology may be used, for example, in a thinly traded and/or fast moving market to ensure that orders are identified as outlying orders only if the price of such an order is sufficiently different from both the nearest contra price and the last traded price.

In still other embodiments, when one or more trading orders in a trading order stack (e.g., a buy order stack or a sell order stack) are removed, the system may determine whether the new top order in that stack is an outlying order based on one or more criteria. If the new top order in that stack is determined to be an outlying order, the system may prevent the outlying order from being promoted to the top of its order stack on a trading display or electronic price feed, thus leaving one or more open spaces at the top of the order stack above the outlying order. This may notify other traders that the outlying order is indeed an outlying order and that such traders should carefully consider the price of the outlying order. In addition, the system may send an alert message to a trader who submits an order in an attempt to execute a trade on the outlying buy or sell order. It should be noted that references to "top orders" or the "top of the stack" are only intended as examples to convey a relative position of one order in a stack as compared to other orders in that stack. The relative positioning of orders in a stack may be accomplished according to any suitable preferences or criteria. For example, the buy order stack could be configured such that the sell order with the lowest offer price is positioned at the bottom of the stack rather than at the top.

As discussed above, when the system identifies an outlying trading order, and a subsequent trader attempts to execute a trade on the outlying order, the system may generate and communicate an alert message to the subsequent trader. The alert message may indicate that the price of the subsequent trader's order may be mistaken and provide the subsequent trader an opportunity to change, or correct, the price of the order. In some embodiments in which the price of the subsequent trader's order includes a whole number component and a fractional number component (such as 94.26), the system may determine that the whole number component (94) of the price is erroneous and thus modify the whole number component (e.g., from 94 to 95) to attempt to arrive at the price that the trader actually intended to submit for the order. The system may then display this proposed modified price (95.26) to the subsequent trader in the alert message and ask the subsequent trader whether he or she accepts this proposed modified price. In some embodiments, the subsequent trader may circumvent the alert message by resubmitting his or her order at the original price.

FIG. 1 illustrates an example trading system 10 for managing trading by determining outlying orders and using alert messages according to an embodiment of the present invention. As shown, system 10 may include one or trader terminals 12 and one or more market information sources 14 coupled to a trading platform 16 by a communications network 18.

A trader terminal 12 may provide a trader 20 access to engage in trading activity via trading platform 16. A trader terminal 12 may include a computer system and appropriate software to allow trader 20 to engage in trading activity on one or more trading exchanges provided by trading platform 16. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device. A trader terminal 12 may include one or more human interface, such as a mouse, keyboard, or pointer, for example.

Traders 20 may include any entity, such as an individual, group of individuals or firm, that engages in trading activity via trading system 10. For example, a trader 20 may be an individual investor, a group of investors, or an institutional investor. Traders 20 may also include market makers, such as any individual or firm that submits and/or maintains both bid and ask orders simultaneously for the same instrument.

Traders 20 may place various trading orders 22 onto one or more trading exchanges provided by trading platform 16. Trading platform 16 may provide any suitable type of trading exchanges for trading orders 22, such as for example, auction-type exchanges, entertainment-type exchanges, and trading exchanges for trading various financial instruments (such as stocks or other equity securities, bonds, mutual funds, options, futures, derivatives, swaps, and currencies, for example). Such trading orders 22 may include buy orders 24, sell orders 26, or both, and may be any type of order which may be managed by a trading platform 16, such as market orders, limit orders, day orders, open orders, GTC ("good till cancelled") orders, "good through" orders, an "all or none" orders, or "any part" orders, for example and not by way of limitation.

Each buy order 24 may be at least partially defined by a bid price and size, while each sell order 26 may be at least partially defined by an offer price and size. The price for each order—in other words, the bid price for each buy order 24 and the offer price for each sell order 26—may include (a) a whole number component, which may be referred to as a "handle," and (b) a fractional number component, which may be expressed as a decimal, a fraction, a combination of a decimal and fraction, or otherwise expressed. For example, in a market in which the tick size is ¼ of ¹⁄₃₂ (i.e., ¼/32) of a point, a price displayed as 94.26¼ is defined by a handle of 94 and a fractional number component of 26¼, which represents 26¼/32 of a point (or approximately 0.8203). The ¼ may also be represented as ⅖ making a price display of 94.262. Table 1 illustrates example prices, example formats in which prices may be displayed by trading platform 16, the handle for such prices, and the fractional number component of such prices.

TABLE 1

Example formats for displaying prices and the components of such prices.

| Price | May be displayed as: | Handle component | Fractional component |
|---|---|---|---|
| 94²⁶⁄₃₂ | 94.26 | 94 | .26 (i.e., ²⁶⁄₃₂ or 0.8125) |
| 94²⁶ ¹/⁴/32 | 94.26¼ | 94 | .26¼ (i.e., ²⁶·²⁵⁄₃₂ or 0.8203) |
| 94²⁶ ¹/⁴/32 | 94.262 | 94 | .262 (i.e., ²⁶·²⁵⁄₃₂ or 0.8203) |
| 42.5125 | 42.5125 | 42 | .5125 |

Market information sources 14 may be operable to communicate market information 28 to trading platform 16. Market information 28 may include any current and/or historical information regarding one or more markets for various instruments, such as price information, price movement information, volatility information, and trading volume information, for example. Market information 28 may also include current and/or historical financial or monetary information, such as interest rate information and information regarding currencies, for example. As discussed in greater detail below, trading platform 16 may use market information for various purposes, such as for determining and updating threshold values 40 used for identifying outlying trading orders 22. Market information sources 14 may include any source or recipient of market information 28 that may communicate such market information 28 to trading platform 16. For example, market information sources 14 may include other trading platforms, trading exchanges, brokers, financial institutions, data vendors or a Government Statistical Bureau.

Communications network 18 is a communicative platform operable to exchange data or information between trader terminals 12, market information sources 14, and trading platform 16. In a particular embodiment of the present invention, communications network 18 represents an Internet architecture which provides traders 20 with the ability to electronically execute trades or initiate transactions to be delivered to an authorized exchange trading floor. Alternatively, communications network 18 could be a plain old telephone system (POTS), which traders 20 could use to perform the same operations or functions. Such transactions may be assisted by a broker associated with trading platform 16 or manually keyed into a telephone or other suitable electronic equipment in order to request that a transaction be executed. In other embodiments, communications system 14 could be any packet data network (PDN) offering a communications interface or exchange between any two nodes in system 10. Communications network 18 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

Trading platform 16 is a trading architecture that provides access to one or more trading exchanges in order to facilitate the trading of trading orders 22. Trading platform 16 may be a computer, a server, a management center, a single workstation, or a headquartering office for any person, business, or entity that seeks to manage the trading of trading orders 22. Accordingly, trading platform 16 may include any suitable hardware, software, personnel, devices, components, elements, or objects that may be utilized or implemented to achieve the operations and functions of an administrative body or a supervising entity that manages or administers a trading environment.

In some embodiments, trading platform 16 may be associated with or comprise one or more web servers 30 operable to store websites and/or website information 32 in order to host one or more web pages 34. Web servers 30 may be coupled to communication network 18 and may be partially or completely integrated with, or distinct from, trading platform 16. A trading terminal 12 may include a browser application 36 operable to provide an interface to web pages 34 hosted by web servers 30 such that traders 20 may communicate information to, and receive information from, trading module 50 via communication network 18. In particular, browser application 36 may allow a trader 20 to navigate through, or "browse," various Internet web sites or web pages 34 hosted by a web server 30 to provide an interface for communications between the trader 20 and trading platform 16. For example, one or more web pages 34 may facilitate the communication of trading orders 22 from traders 20 to trading platform 16, the communication of alert messages 40 from trading platform 16 to traders 20, and the communication of responses 42 to alert messages 40 from traders 20 to trading platform 16.

Trading platform 16 may include a trading module 50 operable to receive trading orders 22 from traders 20 and to manage or process those trading orders 22 such that financial transactions among and between traders 20 may be performed. Trading module 50 may have a link or a connection to a market trading floor, or some other suitable coupling to any suitable element that allows for such transactions to be consummated.

Trading module 50 may be operable to identify buy orders 24 and sell orders 26 having outlying bid or offer prices and to send alert messages 40 to the traders 20 who placed such outlying trading orders 22. As discussed above, each such alert message 40 may indicate that the bid or offer price of the outlying order 22 may be erroneous and may allow the relevant trader 20 to modify bid or offer price for the order 22 or to place the order 22 at the original price.

As show in FIG. 1, trading module 50 may include a processing unit 52 and a memory unit 54. Processing unit 52 may process data associated with trading orders 22 or otherwise associated with system 10, which may include executing software 56 or other coded instructions that may in particular embodiments be associated with trading module 50. Memory unit 56 may store software 56, trading orders 22 received from traders 20, a set of trading management rules 58, one or more threshold values 60, and market information 28 received from market information sources 14. Memory unit 56 may be coupled to data processing unit 52 and may include one or more databases and other suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), or any other suitable volatile or non-volatile memory devices.

It should be understood that the functionality provided by communications network 18 and/or trading module 50 may be partially or completely manual such that one or more humans may provide various functionality associated with communications network 18 or trading module 50. For example, a human agent of trading platform 16 may act as a proxy or broker for placing trading orders 22 on trading platform 16.

Trading module 50 may manage and process trading orders 22 based at least on trading management rules 58. Trading management rules 58 may include rules defining, for example, how to determine whether particular trading orders 22 are outlying orders, how to generate alert messages 40, how to determine and/or update threshold values 60, and how to manage the promotion of buy orders 24 and sell orders 26 within queues, or stacks, of such orders 24 and 26.

Identifying Outlying Orders Based on Contra Market Prices

In some embodiments, trading management rules 58 generally provide for identifying outlier trading orders 22 by comparing the price of each trading order 22 that is promoted to the top of its respective order stack (i.e., the buy order stack or the sell order stack) with the price of the top order 22 in the contra market. For example, when a sell order 26 is promoted to the top of the sell order stack, trading module 50 determines whether the newly promoted sell order 26 is an outlying order by determining whether the offer price of the newly promoted sell order 26 exceeds the bid price of one or more buy orders 24 in the buy order stack by more than a threshold value 60. In a particular embodiments, trading module 50 determines whether the newly promoted sell order 26 is an outlying order by determining whether the offer price of the newly promoted sell order 26 exceeds the bid price of the top buy order 24 by more than a threshold value 60.

When an outlying buy order is identified, trading module 50 initiates or effects a restrictive action regarding the either, or both of, the outlying buy order or a subsequent attempt to execute a trade with the outlying buy order. As discussed above, the restrictive action may include any suitable restrictive action, such as sending an alert message 40 to a trader attempting to execute a trade with the outlying buy order, preventing the outlying buy order from being promoted or advanced within the buy order stack, preventing the outlying buy order from being displayed, and preventing other traders from executing trades on the outlying buy order, for example.

To illustrate, suppose at a particular point in time, the trading exchange for a 10-year US Treasury bond includes a buy order stack and a sell order stack including the following buy orders 24 and sell orders 26, respectively:

| Buy orders (bid price) | Sell orders (offer price) |
|---|---|
| 98.26¼ | 98.26½ |
| 98.26 | 99.26 |
| 98.25¾ | |

Now suppose that the 98.26½ sell order is removed from the sell order stack, such as if the 98.26½ sell order is cancelled or traded with a newly received buy order having a bid price at or above 98.26½. As a result, the 99.26 sell order is promoted to the top of the sell order stack. As a result of the 99.26 sell order being promoted to the top of the sell order stack, trading module 50 determines whether the 99.26 sell order is an outlying order by determining whether the 99.26 offer price of the sell order exceeds the bid price of the current top buy order, 98.26¼, by more than the threshold value. Further suppose that the current threshold value 60 for a 10-year US Treasury bond is ³⁄₃₂ of a point. Here, the 99.26 offer price of the top sell order exceeds the 98.26½ bid price of the top buy order by more than the threshold value of ³⁄₃₂, and thus the 99.26 sell order is determined to be an outlying sell order.

As a result of determining that the 99.26 sell order is an outlying sell order, trading module 50 may generate and communicate an alert message 40 to any trader who submits a buy order that would naturally trade with the 99.26 sell order. For example, if a subsequent trader submits a subsequent buy order with a bid price of 99.26 (in an attempt to trade with the 99.26 sell order), trading module 50 may generate and communicate an alert message 40 to the subsequent trader indicating that the bid price of the subsequent buy order 24 may be mistaken and providing the subsequent trader an opportunity to change, or correct, the price of the subsequent buy order 24. One rationale for sending such an alert message 40 is that the subsequent trader may not have noticed that the handle (i.e., the whole number component) of the top sell order had jumped from 98 to 99, and may have thus intended to enter a bid price of 98.26 rather than 99.26. In addition, as discussed below in greater detail, trading module 50 modify the whole number component of the subsequent trader's bid price from 99 to 98 (e.g., to attempt to match the subsequent trader's actual intent), display the proposed modified bid price of 98.26 to the subsequent trader, and ask the subsequent trader whether he or she would like to place the subsequent buy order 24 at the proposed modified bid price of 98.26.

Similarly, when a buy order 24 is promoted to the top of the buy order stack, trading module 50 determines whether the newly promoted buy order 24 is an outlying order by determining whether the bid price of the newly promoted buy order 24 is less than the offer price of one or more sell orders 26 in the sell order stack by more than a threshold value 60. In a particular embodiments, trading module 50 determines whether the newly promoted buy order 24 is an outlying order by determining whether the bid price of the newly promoted buy order 26 is less than the offer price of the top sell order 26 by more than a threshold value 60. As discussed above, in some embodiments, the "top" sell order 26 is the sell order at the top of the sell order stack, which may or may not be the sell order 26 having the lowest current offer price, depending on the particular embodiment. When an outlying sell order is identified, trading module 50 may initiate or effect a restrictive action regarding the either, or both of, the outlying sell order or a subsequent attempt to execute a trade with the outlying sell order. As discussed above, the restrictive action may include any suitable restrictive action.

To illustrate, suppose at a particular point in time, the trading exchange for a 30-year US Treasury bond includes a buy order stack and a sell order stack including the following buy orders 24 and sell orders 26, respectively:

| Buy orders (bid price) | Sell orders (offer price) |
|---|---|
| 98.26¼ | 98.26¾ |
| 97.27 | 98.26¾ |
| | 98.27 |

Now suppose that the 98.26¼ buy order is removed from the buy order stack, such as if the 98.26¼ buy order is cancelled or traded with a newly received sell order having an offer price at or below 98.26¼. As a result, the 97.27 buy order is promoted to the top of the buy order stack. As a result of the 97.27 buy order being promoted to the top of the sell order stack, trading module 50 determines whether the 97.27 buy order is an outlying order by determining whether the 97.27 bid price of the buy order is less than the offer price of the current top sell order, 98.26¾, by more than the threshold value. Further suppose that the current threshold value 60 for a 30-year US Treasury bond is ⁷⁄₃₂ of a point. Here, the 97.27 bid price of the top buy order is less than the 98.26¾ offer price of the top sell order by more than the threshold value of ⁷⁄₃₂, and thus the 97.27 buy order determined to be an outlying buy order.

As a result of determining that the 97.27 buy order is an outlying sell order, trading module 50 may generate and communicate an alert message 40 to any trader who submits a sell order that would naturally trade with the 97.27 buy order. For example, if a subsequent trader submits a subsequent sell order with a offer price of 97.27 (in an attempt to trade with the 97.27 buy order), trading module 50 may generate and communicate an alert message 40 to the subsequent trader indicating that the offer price of the subsequent sell order 26 may be mistaken and providing the subsequent trader an opportunity to change, or correct, the price of the subsequent sell order. As discussed above, one rationale for sending such an alert message 40 is that the subsequent trader may not have noticed that the handle (i.e., the whole number component) of the top buy order had jumped from 98 to 97, and may have thus intended to enter an offer price of 98.27 rather than 97.26. In addition, as discussed below in greater detail, trading module 50 modify the whole number component of the subsequent trader's offer price from 97 to 98 (e.g., to attempt to match the subsequent trader's actual intent), display the proposed modified offer price of 98.27 to the subsequent trader, and ask the subsequent trader whether he or she would like to place the subsequent sell order 26 at the proposed modified offer price of 98.27.

FIG. 2 illustrates an example method of identifying outlying trading orders 22 by comparing trading orders 22 with contra market prices, and sending alert messages 40 to traders 20 attempting to trade on such outlying trading orders 22, in accordance with an embodiment of the present invention. The example discussed below regards identifying an outlying sell order 26 and sending an alert message 40 to a trader 20 attempting to trade on such outlying sell order 26. However, it should be understood that the method may similarly apply for identifying an outlying buy order 24 and sending an alert message 40 to a trader 20 attempting to trade on such outlying buy order 24. It should also be understood that various other restrictive actions (i.e., other than sending an alert message 40) may be implemented as a result of identifying outlying trading orders 22.

At step 100, one or more buy orders 24 and one or more sell orders 26 are received from traders 20 and placed onto a trading exchange by trading platform 16. The buy orders 24 and sell orders 26 are placed in a buy order stack (or queue) and a sell order stack (or queue), respectively, and ordered according to any suitable criteria, such as using a FIFO (first in, first out) system, an interactive matching system as detailed in U.S. Pat. No. 6,560,580, or based on the relative bid and offer prices associated with such received buy orders 24 and sell orders 26, for example.

At step 102, one or more sell orders 26 are removed from the sell order stack (such as if the one or more sell orders 26 are cancelled or traded with one or more buy orders 24). As a result, a particular sell order 26 is promoted to the top of the sell order stack, thus becoming the current top sell order.

At step 104, as a result of the particular sell order 26 being promoted to the top of the sell order stack, trading module 50 determines whether the particular sell order 62 is an outlying order by determining whether the offer price of the particular sell order 26 exceeds the bid price of the current top buy order—i.e., the bid price of the buy order 24 currently at the top of the buy order stack—by more than a current threshold value 60. As discussed in greater detail below, the threshold value 60 may be based on market conditions and may be variable over time.

If it is determined that the particular sell order 26 is not an outlying order, the method may return to step 100 such that other buy orders 24 and/or sell orders 26 may be received, placed, traded, cancelled, or otherwise managed. However, if it is determined at step 104 that the particular sell order is an outlying sell order, trading module 50 may note the outlying sell order at step 106 and wait for buy orders 24 that would naturally cause a trade with the outlying sell order. In some alternative embodiments, the identified outlying sell order may be removed temporarily from the sell order stack or cancelled altogether.

At step 108, trading platform 16 receives from a subsequent trader a subsequent buy order 24 that would naturally trade with the outlying sell order. In other words, the bid price of the subsequent buy order 24 is greater than or equal to the offer price of the outlying sell order. In some instances, the handle (i.e., the whole number component) of the outlying sell order may be larger than the current market and the subsequent trader may have submitted the subsequent buy order 24 without realizing the larger handle of the outlying sell order. In other words, the subsequent trader may have mistakenly considered only the fractional number component of the outlying sell order when submitting his or her buy order 24.

At step 110, as a result of receiving the subsequent buy order 24 that would naturally trade with the outlying sell order, trading module 50 generates and communicates an alert message 40 to the subsequent trader indicating that the bid price of the subsequent trader's buy order 24 may be mistaken and providing the subsequent trader an opportunity to change, or correct, the bid price of his or her buy order 24. In some embodiments, trading module 50 may modify the handle of the bid price of the subsequent trader's buy order 24 (e.g., to attempt to match the trader's actual intent), display the proposed modified bid price to the subsequent trader, and ask the subsequent trader whether he or she would like to place the subsequent buy order 24 at the proposed modified bid price.

At step 112, trading module 50 prevents the subsequent trader's buy order 24 from being placed on the trading exchange at least until a response 42 to the alert message 40 is received from the subsequent trader 20. At step 114, trading module 50 receives a response 42 to the alert message 40 from the subsequent trader 20. If the response 42 indicates that the subsequent trader 20 accepts the proposed modified bid price for his or her buy order 24, trading module 50 places the subsequent trader's buy order 24 on the trading exchange at the proposed modified bid price at step 116. Alternatively, the subsequent trader's response 42 may indicate that the subsequent trader 20 declines the proposed modified bid price for his or her buy order 24. For example, at step 118, the subsequent trader 20 may choose to cancel his or her buy order 42 in response to receiving the alert message 40. As another example, at step 120, the subsequent trader 20 may choose to circumvent the alert message 40 by resubmitting his or her buy order 24 at the original bid price. If the subsequent trader 20 resubmits his or her buy order 24 at the original bid price, trading module 50 may place the resubmitted buy order 24 on the trading exchange at the original bid price and/or execute a trade between the resubmitted buy order 24 and the outlying sell order (if the outlying sell order is still available) at step 122.

It should be understood that the techniques discussed above for determining whether a sell order 26 is an outlying sell order and sending an alert message to a trader 20 submitting a subsequent buy order 24 may be similarly used to determine whether a buy order 24 is an outlying buy order and sending an alert message to a trader 20 submitting a subsequent sell order 26.

Identifying Outlying Orders Based on Previous Trade Prices

In some embodiments, trading management rules 58 generally provide for identifying outlier trading orders 22 by comparing the price of each trading order 22 that is promoted to the top of its respective order stack (i.e., the buy order stack or the sell order stack) with the price of one or more previous trades. For example, when a sell order 26 is promoted to the top of the sell order stack, trading module 50 determines whether the newly promoted sell order 26 is an outlying order by determining whether the offer price of the newly promoted sell order 26 exceeds the price(s) of one or more previous trades in the trading exchange by more than a threshold value 60. Comparing an order price to the price(s) of one or more previous trades may comprise comparing the order price to the price(s) at which one or more previous trades were executed or submitted for execution. In a particular embodiment, the order price in question is compared with the price at which the most recent trade was executed or submitted for execution. When an outlying trading order 22 is identified, trading module 50 may initiate or effect a restrictive action regarding the either, or both of, the outlying trading order 22 or a subsequent attempt to execute a trade with the outlying trading order 22. As discussed above, the restrictive action may include any suitable restrictive action.

To illustrate, suppose at a particular point in time, the trading exchange for a 5-year US Treasury bond includes a buy order stack and a sell order stack including the following buy orders 24 and sell orders 26, respectively:

| Buy orders (bid price) | Sell orders (offer price) |
|---|---|
| 93.14½ [traded] | 93.14½ [traded] |
| 93.14¼ | 93.14¾ |
| 93.13¾ | 94.13½ |
| 93.13½ | |

Suppose that a trade is executed (or submitted for execution) between the matching 93.14½ buy order and 93.14½ sell order at the price of 93.14½. The 93.14½ buy order and 93.14½ sell order are thus removed from the buy and sell order stacks. As a result, the 93.13¼ buy order is promoted to the top of the buy order stack, thus becoming the current top buy order, and the 93.14¾ sell order is promoted to the top of the sell order stack, thus becoming the current top sell order. As a result of the 93.13¼ buy order and the 93.14¾ sell order being promoted to the top of the their respective order stacks, trading module 50 may determine whether either (or both) of the 93.13¼ buy order and the 93.14¾ sell order are outlying orders. Trading module 50 may determine whether the 93.13¼ buy order is an outlying order by determining whether the 93.13¼ bid price is less than the price of the previous trade—here, 93.14½—by more than a threshold value 60. Suppose that the current threshold value for 5-year US Treasury bonds is $\frac{2}{32}$. Trading module 50 would determine that the 93.13¼ bid price of the buy order is not less than the 93.14½ trade price by more than the $\frac{2}{32}$ threshold value, and that the 93.13¼ buy order is not an outlying order. (Recall from Table 1 that the displayed bid price of 93.13¼ represents an actual bid price of $93^{13.25}/_{32}$ and the previous trade price of 93.14½ represents an actual trade price of $93^{14.5}/_{32}$. Thus, the 93.13¼ bid price is within $\frac{2}{32}$ of the 93.14½ trade price.)

Similarly, trading module 50 may determine whether the 93.14¾ sell order is an outlying order by determining whether the 93.14¾ offer price exceeds the previous trade price of 93.14½ by more than the $\frac{2}{32}$ threshold value. Trading module 50 would determine that the 93.14¾ offer price of the sell order does not exceed the 93.14½ trade price by more than the $\frac{2}{32}$ threshold value, and that the 93.14¾ sell order is not an outlying order.

Next suppose that the 93.14¾ sell order is removed from the sell order stack, such as if the 93.14¾ sell order is cancelled or traded with a newly received buy order having a bid price at or above 93.14¾. As a result, the 94.13½ sell order is promoted to the top of the sell order stack, thus becoming the new current top sell order on the exchange. As a result of the 94.13½ sell order being promoted to the top of the sell order stack, trading module 50 determines whether the 94.13½ sell order is an outlying order by determining whether the 94.13½ offer price of the sell order exceeds the previous trade price of 93.14½ by more than the $\frac{2}{32}$ threshold value. Trading module 50 would determine that the 94.13½ offer price of the sell order does exceed the 93.14½ trade price by more than the $\frac{2}{32}$ threshold value, and that the 94.13½ sell order is thus an outlying order.

As a result of determining that the 94.13½ sell order is an outlying sell order, trading module 50 may generate and communicate an alert message 40 to any subsequent trader who submits a subsequent buy order 24 that would naturally trade with the 94.13½ sell order. For example, if a subsequent trader submits a subsequent buy order 24 with a bid price of 94.13½ (in an attempt to trade with the 94.13½ sell order), trading module 50 may generate and communicate an alert message 40 to the subsequent trader indicating that the bid price of the subsequent trader's buy order 24 may be mistaken and providing the subsequent trader an opportunity to change, or correct, the bid price of his or her order. In addition, as discussed below in greater detail, trading module 50 modify the whole number component of the subsequent trader's bid price from 94 to 93 (e.g., to attempt to match the subsequent trader's actual intent), display the proposed modified bid price of 93.13½ to the subsequent trader, and ask the subsequent trader whether he or she would like to place the buy order 24 at the proposed modified bid price of 93.13½.

In a similar manner, when trading module 50 determines that a particular buy order 24 promoted to the top of the buy order stack is an outlying order, trading module 50 may generate and communicate an alert message 40 to any trader who submits a sell order 26 that would naturally trade with the particular buy order 24.

FIG. 3 illustrates an example method of identifying outlying trading orders 22 by comparing trading orders 22 with a previous trade price, and sending alert messages 40 to traders 20 attempting to trade on such outlying trading orders 22, in accordance with an embodiment of the present invention. The example discussed below regards identifying an outlying sell order 26 and sending an alert message 40 to a trader 20 attempting to trade on such outlying sell order 26. However, it should be understood that the method may similarly apply for identifying an outlying buy order 24 and sending an alert message 40 to a trader 20 attempting to trade on such outlying buy order 24. It should also be understood that various other restrictive actions (i.e., other than sending an alert message 40) may be implemented as a result of identifying outlying trading orders 22.

At step 150, one or more buy orders 24 and one or more sell orders 26 are received from traders 20 and placed onto a trading exchange by trading platform 16. The buy orders 24 and sell orders 26 are placed in a buy order stack and a sell order stack, respectively, and ordered according to any suitable criteria, such as using a FIFO (first in, first out) system, an interactive matching system such as that defined in U.S. Pat. No. 6,560,580, or based on the relative bid and offer prices associated with such received buy orders 24 and sell orders 26, for example.

At step 152, one or more trades are executed between buy orders 24 in the buy order stack and sell orders 26 in the sell order stack. Each of the executed buy orders 24 and sell orders 26 may be removed from their respective stacks as they are executed. At step 154, one or more sell orders 26 are removed from the sell order stack (as a result of such sell order(s) being cancelled or executed (i.e., traded) with one or more buy orders 24, for example). As a result, a particular sell order 26 is promoted to the top of the sell order stack, thus becoming the current top sell order on the exchange.

At step 156, as a result of the particular sell order 26 being promoted to the top of the sell order stack, trading module 50 determines whether the particular sell order 62 is an outlying order by determining whether the offer price of the particular sell order 26 exceeds a previous trade price—for example, the price at which the most recent trade at step 152 was executed—by more than a current threshold value 60. As discussed in greater detail below, the threshold value 60 may be based on market conditions and may be variable over time.

If it is determined that the particular sell order 26 is not an outlying order, the method may return to step 150 such that other buy orders 24 and/or sell orders 26 may be received, placed, traded, cancelled, or otherwise managed. However, if it is determined at step 156 that the particular sell order is an outlying sell order, trading module 50 may note the outlying sell order at step 158 and wait for buy orders 24 that would naturally cause a trade with the outlying sell order.

At step 160, trading platform 16 receives from a subsequent trader a subsequent buy order 24 that would naturally trade with the outlying sell order. In other words, the bid price of the subsequent buy order 24 is greater than or equal to the offer price of the outlying sell order. As discussed above, in some instances, the handle (i.e., the whole number component) of the outlying sell order may be larger than the current market and the subsequent trader may have submitted the subsequent buy order 24 without realizing the larger handle of the outlying sell order.

At step 162, as a result of receiving the subsequent buy order 24 that would naturally trade with the outlying sell order, trading module 50 generates and communicates an alert message 40 to the subsequent trader indicating that the bid price of the subsequent trader's buy order 24 may be mistaken and providing the subsequent trader an opportunity to change, or correct, the bid price of his or her buy order 24. In some embodiments, trading module 50 modify the handle of the bid price of the subsequent trader's buy order 24 (e.g., to attempt to match the trader's actual intent), display the proposed modified bid price to the subsequent trader, and ask the subsequent trader whether he or she would like to place the buy order 24 at the proposed modified bid price.

At step 164, trading module 50 prevents the subsequent trader's buy order 24 from being placed on the trading exchange at least until a response 42 to the alert message 40 is received from the subsequent trader 20. At step 166, trading module 50 receives a response 42 to the alert message 40 from the subsequent trader 20. If the response 42 indicates that the subsequent trader 20 accepts the proposed modified bid price for the buy order 24, trading module 50 places the subsequent buy order 24 on the trading exchange at the proposed modified bid price at step 168. Alternatively, the subsequent trader's response 42 may indicate that the subsequent trader 20 declines the proposed modified bid price for the buy order 24. For example, at step 170, the subsequent trader 20 may choose to cancel his or her buy order 42 in response to receiving the alert message 40. As another example, at step 172, the subsequent trader 20 may choose to circumvent the alert message 40 by resubmitting his or her buy order 24 at the original bid price. If the subsequent trader 20 resubmits his or her buy order 24 at the original bid price, trading module 50 may place the resubmitted buy order 24 on the trading exchange at the original bid price and/or execute a trade between the resubmitted buy order 24 and the outlying sell order (if the outlying sell order is still available) at step 174.

It should be understood that the techniques discussed above for determining whether a sell order 26 is an outlying sell order and sending an alert message to a trader 20 submitting a subsequent buy order 24 may be similarly used to determine whether a buy order 24 is an outlying buy order and sending an alert message to a trader 20 submitting a subsequent sell order 26.

Managing the Promotion of Orders in an Order Stack

In some embodiments, trading management rules 58 generally provide for identifying outlier trading orders 22 on a trading exchange and managing the promotion of such identified outlier trading orders 22 on the trading exchange. For example, when one or more sell orders 26 are removed from a sell order stack (such as when such sell order(s) are cancelled or executed (i.e., traded) with one or more buy orders 24, for example), trading system 30 may determine whether to (a) promote the highest remaining sell order 26 in the sell order stack to the top of the sell order stack, or (b) to not promote the highest remaining sell order 26 in the sell order stack to the top of the stack, but rather to leave the one or more positions in the sell order stack above the highest remaining sell order 26 open, and to send an alert message 40 to any trader 20 that subsequently submits a buy order 24 that would naturally trade with the outlying sell order 26. As discussed above, references to "top orders" or the "top of the stack" are only intended as examples to convey relative positions of orders in a stack, which positioning of orders may be managed according to any suitable preferences or criteria. For example, in some embodiments, a bid-offer stack includes a vertical list of numbers representing prices increasing from the bottom to the top of the list, wherein existing buy orders are displayed (indicating the order size of each buy order) on one side of the number list based on their respective bid prices and existing sell orders are displayed (indicating the order size of each sell order) on the other side of the number list based on their respective offer prices. Thus, in such embodiments, the existing buy order having the highest bid price is physically located above other existing buy orders, and such buy order may be referred to as the top buy order or the buy order at the top of the buy order stack. Further, in such embodiments, the existing sell order having the lowest offer price is physically located below other existing sell orders. However, for the purposes of the present document, despite being physically located below the other existing sell orders, the existing sell order having the lowest offer price may be referred to as the top sell order or the sell order at the top of the sell order stack. Thus, it should be understood that in some situations, references to the "top order" or the "top of a stack" may refer to the best existing order or the order at the front (or in the example embodiment discussed above, at the physical bottom) of a stack of orders.

Similarly, when one or more buy orders 24 are removed from a buy order stack (such as when such buy order(s) are cancelled or executed (i.e., traded) with one or more buy orders 24, for example), trading system 30 may determine whether to (a) promote the highest remaining buy order 24 in the buy order stack to the top of the buy order stack, or (b) to not promote the highest remaining buy order 24 in the buy order stack to the top of the stack, but rather to leave the one or more positions in the buy order stack above the highest remaining buy order 24 open, and to send an alert message 40 to any trader 20 that subsequently submits a sell order 26 that would naturally trade with the outlying buy order 24.

In some embodiments, trading module 50 determines whether the trading order 22 in question is an outlying order by determining whether the price of the trading order differs from one or more other prices by more than one or more threshold values 60. For example, trading module 50 may determine whether a sell order 26 in question is an outlying order by determining whether the price of the sell order 26 exceeds the price of the top current buy order 24 (i.e., the buy order 24 currently at the top of the buy order stack) by more than a threshold value 60, such as discussed above with reference to FIG. 2. As another example, trading module 50 may determine whether a sell order 26 in question is an outlying order by determining whether the price of the sell order 26 exceeds the price(s) of one or more previous trades in the trading exchange by more than a threshold value 60, such as discussed above with reference to FIG. 3.

As yet another example, trading module 50 may determine whether a sell order 26 in question is an outlying order by determining whether the price of the sell order 26 exceeds an estimated current market price by more than a threshold value 60. The estimated current market price may be determined by trading module 30 based on various data, such as various market information 28 received from one or more market information sources 14. For example, in some embodiments, trading module 30 may determine an estimated current market price for an instrument by executing one or more algorithms (using market information 28 as input) that estimate the current middle of the market (for example, the midway point between the current bid market and the current offer market) for the instrument. In particular embodiments, the market information 28 used as input for determining the estimated current market price for a particular instrument includes information from one or more futures markets that are related to the market for the particular instrument.

In certain embodiments, to determine whether a particular sell order 26 is an outlying order includes determining each of the following:

(a) Does the offer price of the sell order 26 exceed the bid price of the top current buy order 24 in the buy order stack by more than a first threshold value 60a?

(b) Does the offer price of the sell order 26 exceed the price(s) of one or more recent trades in the trading exchange by more than a second threshold value 60b? and (c) Does the offer price of the sell order 26 exceed an estimated current market price determined by trading module 30 by more than a third threshold value 60c?

In some embodiments, first threshold value 60a, second threshold value 60b, and third threshold value 60c are the same. In other embodiments, one or more of first threshold value 60a, second threshold value 60b, and third threshold value 60c are different from the others. In addition, as discussed above, each of the threshold values 60a, 60b, and 60c may vary over time according to market conditions. For example, trading module 30 may vary threshold values 60a, 60b, and 60c over time based at least on market information 28 received from various market information sources 14.

In one embodiment, trading module 30 determines that a particular sell order 26 is an outlying order if it is determined that at least one of the three questions (a), (b) and (c) listed above are answered in the affirmative. In another embodiment, trading module 30 determines that a particular sell order 26 is an outlying order if it is determined that at least two of the three questions (a), (b) and (c) listed above are answered in the affirmative. In yet another embodiment, trading module 30 determines that a particular sell order 26 is an outlying order if it is determined that all three of the three questions (a), (b) and (c) listed above are answered in the affirmative. Thus, the standard for determining a trading order 22 to be an outlying order may vary according to the particular embodiment.

It should be understood that the techniques discussed above for determining whether a sell order 26 is an outlying sell order and sending an alert message to a trader 20 submitting a subsequent buy order 24 may be similarly used to determine whether a buy order 24 is an outlying buy order and sending an alert message to a trader 20 submitting a subsequent sell order 26.

Threshold Values 60

As discussed above, threshold values 60 may vary over time at least according to market conditions. For example, a threshold value 60 for a particular market may be determined and/or updated based on the historical or current volatility of that market or one or more related markets. In some embodiments, a threshold value 60 for a particular market may be determined and/or updated based on market information 28 received from one or more market information sources 14. Such market information 28 may indicate the historical or current volatility of that market or one or more related markets. In addition, such market information 28 may include current and/or historical financial or monetary information, such as interest rate information and information regarding currencies, for example.

Trading module 30 may use such market information 28 as input for various algorithms to estimate, for example, the current volatility or current price of the market in question. Trading module 30 may then determine and/or update the threshold value(s) 60 for that market based on the current estimated volatility or price for that market. In some embodiments, trading module 30 may receive market information 28 in real time or substantially in real time and may thus update threshold values 60 in real time or substantially in real time according to current market conditions.

Although an embodiment of the invention and its advantages are described in detail, a person skilled in the art could make various alterations, additions, and omissions without departing from the spirit and scope of the present invention as defined by the appended claims.

What is claimed is:

1. A method, comprising:
in a market for a particular type of instrument, receiving by a processing unit trading orders, each trading order having an associated price;
placing by the processing unit each of the received trading orders on a trading exchange such that the trading orders may be executed;
determining by the processing unit that the price of a particular trading order differs from at least one comparison price by more than a threshold value; and
based at least in part on determining that the price of the particular trading order differs from the at least one comparison price by more than the threshold value, taking, by the processing unit, a restrictive action regarding the particular trading order;
wherein:
placing each of the received trading orders on the trading exchange comprises placing each of the received trading orders in one of a plurality of trading order stacks;
the method further comprises promoting by the processing unit the particular trading order to the top of its respective trading order stack; and
the determination that the price of the particular trading order differs from the at least one comparison price by more than the threshold value is made in response to the particular trading order being promoted to the top of its respective trading order stack.

2. The method of claim 1, wherein:
the received trading orders include buy orders and sell orders, each buy order having an associated bid price and each sell order having an associated offer price;
placing each of the received trading orders in one of the plurality of trading order stacks comprises placing each of the buy orders in a buy order stack and each of the sell orders in a sell order stack;
the particular trading order is a particular sell order in the sell order stack; and
promoting the particular trading order to the top of its respective trading order stack comprises promoting the particular sell order to the top of the sell order stack.

3. The method of claim 1, wherein:
the received trading orders include buy orders and sell orders, each buy order having an associated bid price and each sell order having an associated offer price;
placing each of the received trading orders in one of the plurality of trading order stacks comprises placing each of the buy orders in a buy order stack and each of the sell orders in a sell order stack;
the particular trading order is a particular buy order in the buy order stack; and promoting the particular trading order to the top of its respective trading order stack comprises promoting the particular buy order to the top of the buy order stack.

4. The method of claim 1, further comprising:
receiving from a particular trader a subsequent trading order having an original price that would trade with the price of the particular trading order; and
wherein taking the restrictive action regarding the particular trading order comprises:
generating an alert message regarding the subsequent trading order;
communicating the alert message to the particular trader; and
preventing the subsequent trading order from trading with the particular trading order at least until a response to the alert message is received from the particular trader.

5. The method of claim 4, wherein taking the restrictive action regarding the particular trading order further comprises preventing the subsequent trading order from being placed on the trading exchange at least until a response to the alert message is received from the particular trader.

6. The method of claim 4, wherein:
the particular trading order is a particular sell order having an associated offer price;
receiving from the particular trader the subsequent trading order having the original price that would trade with the price of the particular trading order comprises receiving from the particular trader a subsequent buy order having an original bid price greater than or equal to the offer price of the particular sell order; and
wherein taking the restrictive action regarding the particular trading order comprises:
generating an alert message regarding the subsequent buy order;
communicating the alert message to the particular trader; and
preventing the subsequent buy order from trading with the particular sell order at least until a response to the alert message is received from the particular trader.

7. The method of claim 6, wherein:
the original bid price of the subsequent buy order includes a whole number component and a fractional number component; and
generating the alert message comprises:
determining a proposed modified bid price of the subsequent buy order by modifying the whole number component of the original bid price; and
generating an alert message indicating the proposed modified bid price for the subsequent buy order and requesting the particular trader to accept or decline the proposed modified bid price.

8. The method of claim 7, wherein:
the at least one comparison price includes a whole number component and a fractional number component; and
modifying the whole number component of the original bid price of the subsequent buy order comprises modifying the whole number component of the original bid price of the subsequent buy order to match the whole number component of the at least one comparison price.

9. The method of claim 4, wherein:
the particular trading order is a particular buy order having an associated bid price;
receiving from the particular trader the subsequent trading order having the original price that would trade with the price of the particular trading order comprises receiving from the particular trader a subsequent sell order having an original offer price less than or equal to the bid price of the particular buy order; and
wherein taking the restrictive action regarding the particular trading order comprises:
generating an alert message regarding the subsequent sell order;
communicating the alert message to the particular trader; and
preventing the subsequent sell order from trading with the particular buy order at least until a response to the alert message is received from the particular trader.

10. The method of claim 9, wherein:
the original offer price of the subsequent sell order includes a whole number component and a fractional number component; and
generating the alert message comprises:
determining a proposed modified offer price of the subsequent sell order by modifying the whole number component of the original offer price; and
generating an alert message indicating the proposed modified offer price for the subsequent sell order and requesting the particular trader to accept or decline the proposed modified offer price.

11. The method of claim 10, wherein:
the at least one comparison price includes a whole number component and a fractional number component; and
modifying the whole number component of the original offer price of the subsequent sell order comprises modifying the whole number component of the original offer price of the subsequent sell order to match the whole number component of the at least one comparison price.

12. The method of claim 1, further comprising:
estimating the volatility of one or more markets; and
updating the threshold value based at least on the estimated volatility of the one or more markets.

13. The method of claim 1, further comprising:
receiving price movement information indicating price movements in a related market, the related market comprising a market related to the market for the particular type of instrument; and
updating the threshold value based at least on the received price movement information.

14. The method of claim 1, wherein the at least one comparison price comprises a price at which a most recent previous trade in the market for the particular type of instrument was executed, a bid price of a buy order, or an offer an offer price of a sell order.

15. The method of claim 2, wherein:
the received trading orders include buy orders and sell orders, each buy order having an associated bid price and each sell order having an associated offer price; and
determining that the price of the particular trading order differs from the at least one comparison price by more than the threshold value comprises determining that an offer price of a particular sell order exceeds the at least one comparison price by more than the threshold value.

16. The method of claim 3, wherein:
the received trading orders include buy orders and sell orders, each buy order having an associated bid price and each sell order having an associated offer price; and
determining that the price of the particular trading order differs from the at least one comparison price by more than the threshold value comprises determining that a bid price of a particular buy order is less than the at least one comparison price by more than the threshold value.

17. The method of claim 1, wherein taking the restrictive action regarding the particular trading order comprises at least temporarily preventing, within an electronic display, a promotion of the particular trading order within a trading order stack.

18. A system for managing trading, comprising:
a computer system having at least one processor; and
a computer-readable medium coupled to the computer system, the computer-readable medium comprising a program operable, when executed by the at least one processor, to:
receive trading orders from a plurality of traders in a market for a particular type of instrument, each trading order having an associated price;
place each of the received trading orders on a trading exchange such that the trading orders may be executed;
determine that the price of a particular trading order differs from at least one comparison price by more than a threshold value; and
based at least in part on determining that the price of the particular trading order differs from the at least one comparison price by more than the threshold value, take a restrictive action regarding the particular trading order
wherein:
to place each of the received trading orders on the trading exchange comprises to place each of the received trading orders in one of a plurality of trading order stacks;
the program is further operable, when executed by the at least one processor, to promote the particular trading order to the top of its respective trading order stack; and
the determination that the price of the particular trading order differs from the at least one comparison price by more than the threshold value is made in response to the particular trading order being promoted to the top of its respective trading order stack.

19. The system of claim 18, wherein the at least one comparison price comprises a price at which a most recent previous trade in the market for the particular type of instrument was executed, a bid price of a buy order, or an offer an offer price of a sell order.

20. The method of claim 18, wherein the program is further operable, when executed by the at least one processor, to:
receive from a particular trader a subsequent trading order having an original price that would trade with the price of the particular trading order; and
wherein to take the restrictive action regarding the particular trading order comprises to:
generate an alert message regarding the subsequent trading order;
communicate the alert message to the particular trader; and
prevent the subsequent trading order from trading with the particular trading order at least until a response to the alert message is received from the particular trader.

21. The system of claim 20, wherein to taking the restrictive action regarding the particular trading order further comprises to prevent the subsequent trading order from being placed on the trading exchange at least until a response to the alert message is received from the particular trader.

22. The system of claim 20, wherein:
the original price of the subsequent trading order includes a whole number component and a fractional number component; and
to generate the alert message comprises to:
determine a proposed modified price of the subsequent trading order by modifying the whole number component of the original price; and
generate an alert message indicating the proposed modified price for the subsequent trading order and requesting the particular trader to accept or decline the proposed modified price.

23. The system of claim 22, wherein:
the at least one comparison price includes a whole number component and a fractional number component; and
to modify the whole number component of the original price of the subsequent trading order comprises to modify the whole number component of the original price of the subsequent trading order to match the whole number component of the at least one comparison price.

24. The system of claim 18, wherein to take the restrictive action regarding the particular trading order comprises to at least temporarily prevent, within an electronic display, a promotion of the particular trading order within a trading order stack.

* * * * *